US011869006B1

(12) United States Patent
Rahimi (10) Patent No.: US 11,869,006 B1
(45) Date of Patent: Jan. 9, 2024

(54) SYSTEMS AND METHODS FOR IDENTIFYING SYNTHETIC PARTY IDENTITIES ASSOCIATED WITH NETWORK COMMUNICATIONS

(71) Applicant: MASTERCARD INTERNATIONAL INCORPORATED, Purchase, NY (US)

(72) Inventor: Reza Rahimi, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 172 days.

(21) Appl. No.: 17/177,808

(22) Filed: Feb. 17, 2021

Related U.S. Application Data (60) Provisional application No. 63/071,936, filed on Aug. 28, 2020, provisional application No. 62/977,529, filed on Feb. 17, 2020.

(51) Int. Cl.
| | | |
|---|---|---|
| *G06Q 20/00* | (2012.01) | |
| *G06Q 20/40* | (2012.01) | |
| *G06Q 30/0601* | (2023.01) | |
| *H04L 9/40* | (2022.01) | |

(52) U.S. Cl.
CPC ..... *G06Q 20/4016* (2013.01); *G06Q 30/0609* (2013.01); *H04L 63/0884* (2013.01)

(58) Field of Classification Search
CPC .................................................. G06Q 20/4016
USPC ........................................................ 705/44
See application file for complete search history.

(56) References Cited

U.S. PATENT DOCUMENTS

| | | | | |
|---|---|---|---|---|
| 10,270,808 | B1 * | 4/2019 | Sherif | G06Q 50/265 |
| 2006/0149674 | A1 * | 7/2006 | Cook | G06Q 40/02 |
| | | | | 705/44 |
| 2014/0279611 | A1 * | 9/2014 | Evans | G06Q 20/4014 |
| | | | | 705/317 |

(Continued)

OTHER PUBLICATIONS

An Attribute Assurance Framework to Define and Match Trust in Identity Attributes Published in: 2011 IEEE International Conference on Web Services (pp. 580-587) Authors: Thomas, I. • Meinel, C. (Year: 2011).*

(Continued)

*Primary Examiner* — Bruce I Ebersman
*Assistant Examiner* — John A Anderson
(74) *Attorney, Agent, or Firm* — Harness, Dickey & Pierce, P.L.C.

(57) ABSTRACT

Systems and methods are provided for use in identifying synthetic party identities. One exemplary method includes receiving, at a computing device, a request from a relying party to assess validity of an identity presented by an asserting party in a network communication between the asserting party and the relying party, where the request includes identity data associated with the identity of the asserting party. The method also includes calculating, by the computing device, an assessment metric representative of the validity of the identity of the asserting party, where the assessment metric is based on at least one score derived from the identity data, and transmitting, by the computing device, the assessment metric to the relying party, whereby the relying party utilizes the assessment metric to determine whether or not to further interact with the asserting party in connection with the network communication.

10 Claims, 5 Drawing Sheets

(56) References Cited

U.S. PATENT DOCUMENTS

2016/0086262 A1* 3/2016 Straub ................. G06Q 50/265
 705/38

OTHER PUBLICATIONS

Attribute Aggregation and Federated Identity Published in: 2007 International Symposium on Applications and the Internet Workshops (p. 26) Authors: N. Klingenstein (Year: 2007).*

* cited by examiner

SYSTEMS AND METHODS FOR IDENTIFYING SYNTHETIC PARTY IDENTITIES ASSOCIATED WITH NETWORK COMMUNICATIONS

CROSS-REFERENCE TO RELATED APPLICATIONS

This application claims the benefit of, and priority to, U.S. Provisional Application No. 62/977,529, filed on Feb. 17, 2020, and U.S. Provisional Application No. 63/071,936, filed on Aug. 28, 2020. The entire disclosure of each of the above-referenced applications is incorporated herein by reference.

FIELD

The present disclosure generally relates to systems and methods for identifying synthetic identities associated with network communications and/or requests.

BACKGROUND

This section provides background information related to the present disclosure which is not necessarily prior art.

It is known for different parties to interact with one another, whereby one party asserts to be associated with an identity and the other party (e.g., a relying party, etc.) relies on the assertion. In connection therewith, it is also known for the other party to verify the identity of the one party, for example, by checking a physical document associated with the one party, by accessing a history associated with the one party, etc. For example, banking institutions (broadly, relying parties) are often required to know their customers (e.g., individual parties, business parties, etc.) (i.e., satisfy KYC requirements), such that the banking institutions will verify the identity of their customers when seeking accounts, lines of credit, and/or loans, prior to extending the accounts, lines of credit, or loans to the customers. Moreover, it is further known for parties to present false identities or seek to impersonate parties, in order to defraud relying parties (e.g., banking institutions, individual customers, etc.) and/or the parties being impersonated. Consequently, the relying parties are known to verify physical documents associated with the presented identities, verify government identification numbers (e.g., social security numbers, employer identification numbers (EINs), etc.), request third-party verification of the identities of the parties (e.g., via digital identity services, etc.), and/or check references and/or histories associated with the parties, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Users often apply for accounts or otherwise interact with entities for one or more purposes, whereby the users and the entities each rely on the identities of the others upon entering the interactions. In connection therewith, it is possible for parties (either one of the users or one of the entities (e.g., merchants, etc.) with which the user(s) interact) to provide false identities, which consist of fictitious or fabricated attributes. In some instances, the false identities may be synthetic identities. Synthetic identities are different than fake identities, in that the synthetic identities include combinations of one or more real identity attributes and one or more fictitious or fabricated identity attributes. An exemplary synthetic identity may include Merchant ABC's actual employer identification number (EIN), but a fictitious name and address, etc. (e.g., a name and address other than Merchant ABC's actual name and address, etc.). The synthetic identities may be built over time, such as over a period of weeks, months or even years, using the real identity attributes, whereby the longevity of the synthetic identities makes it problematic for others interacting with the parties to identify the identities as being synthetic or fraudulent (e.g., when using conventional, historical evaluations of the identities, etc.). What's more, when the parties using the synthetic identities are merchants, this may be even more problematic for others interacting with the merchants, as it may be more difficult for them to realize that the merchants are using such synthetic identities.

Uniquely, the systems and methods herein may permit identification of synthetic party identities (e.g., synthetic user identities, synthetic merchant identities, etc.) based on various aspects of the synthetic party identities and presentment of the same. In particular, when a user (e.g., a merchant user, etc.) presents an identity to a relying party (e.g., an acquirer, an issuer, etc.) in connection with a network communication to the relying party (e.g., in connection with an authorization request by the user for a transaction performed at the user, etc.), certain data is gathered about the user from the communication and is provided, along with identity data received from the relying party, in a request from the relying party to an identity network to verify the identity. The identity network, in turn, generates an assessment metric for the user and the presented identity, which is indicative of a likelihood that the identity is a synthetic identity (or not). Specifically, as provided herein, the assessment metric is the aggregate of, for example, scores for confirmed synthetic or even collusive parties, at-risk identity attributes, historical fraud losses, etc. The identity network then transmits, in response to the request, the assessment metric for the identity back to the relying party, whereupon the relying party is able to assess the identity of the user based on the metric. In this manner, the relying party is provided with an assessment of the identity presented by the user sufficient to either assume the risk of interacting with the user, or to terminate the interaction or require further verification of the user's identity.

In addition, the systems and methods herein may permit identification of synthetic identities (e.g., synthetic merchant identities, etc.) based on attribute commonality between asserted identities and identities known or suspected to be fraudulent. In this manner, known or suspected fraudulent identities may be segregated into different attributes thereby permitting fraudulent or synthetic identities to be identified by those attributes, even when presented with additional new or different attributes. That is, when an identity is identified as fraudulent, a fraudster asserting the identity will be inhibited from maintaining one or more attributes of the identity (e.g., valid attributes, etc.) and merely changing fictitious attributes (e.g., a name or address, etc.) before reasserting the identity. Importantly, the systems and methods herein may thus provide enhanced protections for valid attributes, such as government ID numbers, etc., from inclusion in fraudulent identities.

Figure 1:
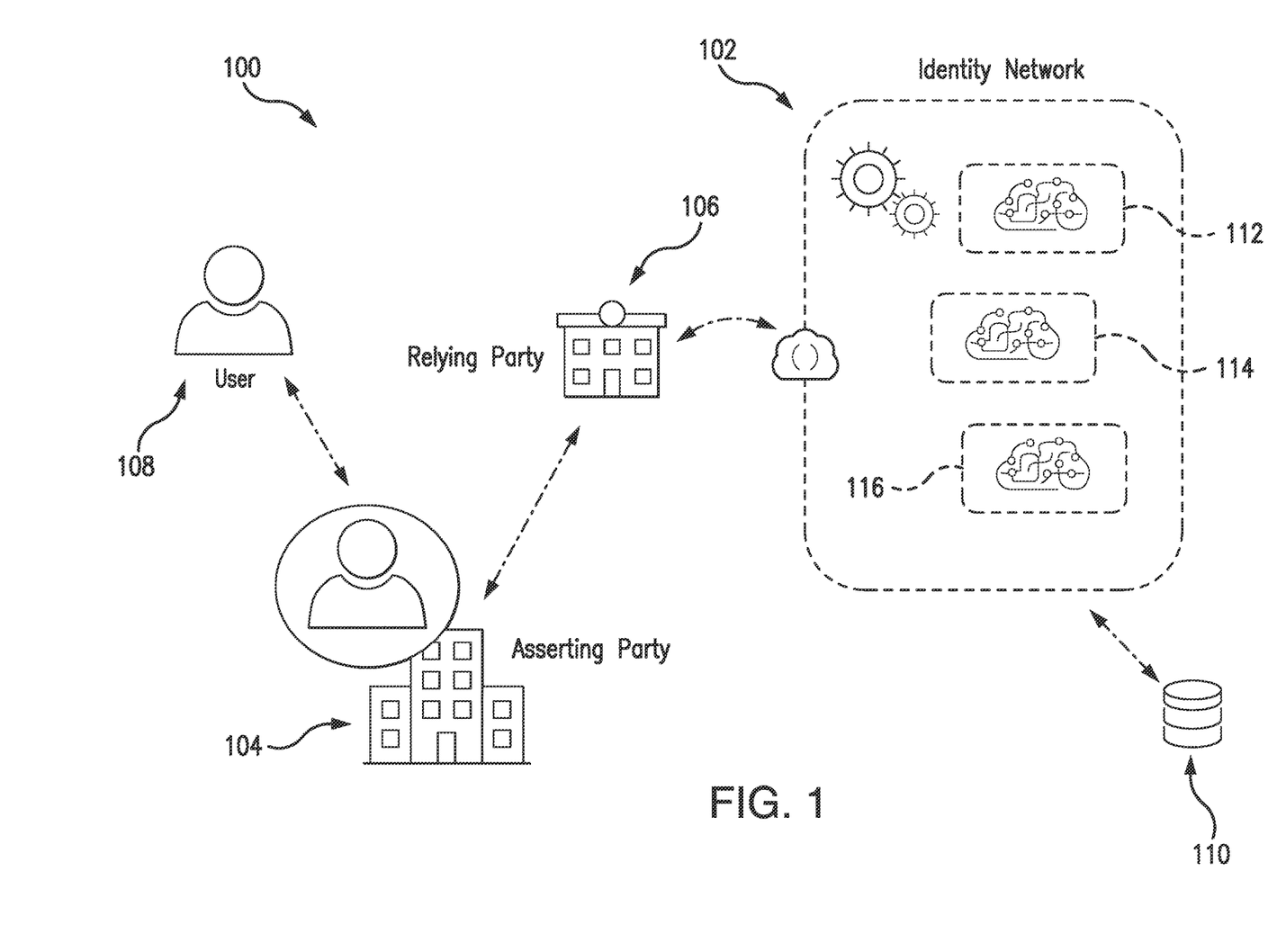
FIG. 1 illustrates an exemplary system of the present disclosure suitable for use in identifying synthetic party identities presented by users in connection with network communications.

FIG. 1 illustrates an exemplary system 100 in which one or more aspects of the present disclosure may be implemented. Although the system 100 is presented in one arrangement, other embodiments may include the parts of the system 100 (or other parts) arranged otherwise depending on, for example, relationships between parties, types of users, types of relying parties, types of interactions, application processes implemented by relying parties, privacy requirements, etc.

The system 100 generally includes an identity network 102 (or identity provider), an asserting party 104 and a relying party 106, each of which is coupled to (and is in communication with) one or more networks. The network(s) is/are indicated generally by arrowed lines in FIG. 1, and may each include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The identity network 102 is configured as a resource for identity verification, and to provide one or more services in connection with verifying identities of parties. In connection therewith in the system 100, the relying party 106 is configured to request identity verification from the identity network 102, based on its interactions with different parties (e.g., with the asserting party 104, etc.), whereby the identity network 102 is configured to provide an assessment of a party's identity (e.g., a score or metric for such identity, etc.), consistent with the description below. The identity network 102 may include a standalone service and/or entity. Additionally, or alternately, the identity network 102 may be incorporated, in whole or in part, with another entity in the system 100, such as, for example, a payment network or a banking institution, etc. Specifically, for example, in one embodiment, the identity network 102 may be incorporated, in whole or in part, into the Mastercard™ payment network.

In various example embodiments, the asserting party 104 is a business entity, such as, for example, a merchant, which offers products (e.g., good, services, etc.) for sale to customers, and which asserts to be associated with a number of different identity attributes (broadly, identity data), which are either real, false, or a combination thereof (e.g., as part of a synthetic identity, etc.). For example, and for purposes of the description herein, the asserting party 104 is a merchant associated with a synthetic identity (i.e., the asserting party 104 is a fraudster), in which the asserting party 104 has an EIN that is a legitimate EIN but belongs to another merchant, a legitimate name, and also a real address (but not an address associated with the merchant owner of the EIN), etc. In another example, the asserting party 104 may have a legitimate EIN (or federal or state tax ID) (again tied to a real merchant), but may have one or more of a fake or fabricated name, address, website, and listing of services and/or offerings. In connection therewith, in either case, the asserting party 104 is in business at a physical location (e.g., a fixed physical location, a mobile location that is still physical, etc.) and/or at a virtual location, and offers products (e.g., goods, services, etc.) (real or fabricated) for sale to users at the location, such as, for example, to user 108.

It should be appreciated that while the asserting party 104 is a fraudster in this embodiment, the asserting party 104 may further be a real party (e.g., merchant, etc.) that is complicit with one or more fraudsters, whereby the asserting party 104 permits a fraudster to engage in payment account transactions at the asserting party 104, knowing of the fraudsters intent to commit fraud but without halting, stopping, reporting or otherwise inhibiting the fraudster (e.g., where the asserting party 104 may be a collusive merchant, etc.).

The relying party 106 in the system 100 may include any entity that relies on an identity of the asserting party 104 to conduct business and/or interact with the party. As an example, the relying party 106 may include a banking institution, which is an issuer of accounts for use by various parties. Specifically, for example, the relying party 106 may be an acquirer, which has issued an account to the asserting party 104 for receipt (or deposit) of funds that are directed to the asserting party 104 in connection with transactions between the asserting party 104 and users (e.g., user 108, etc.). Alternatively, the relying party 106 may include an issuer of a payment account for the user 108, which is used to fund the purchase of product(s) from the asserting party 104. Regardless of the type of the relying party 106, though, it should be appreciated that the relying party 106 has an interest in verifying the identity of the asserting party 104 (or any other party involved in a transaction with which the relying party 106 is involved). A failure by the relying party 106 to properly identify the asserting party 104, for example, may result in, among other things, financial loss to the relying party 106, exposure of consumer's payment account information for fraudulent purposes, loss of reputation, targeting by fraudsters, etc.

In addition, the relying party 106 is configured to investigate, from time to time, accusations and/or indications of a false or synthetic identity, whereby the relying party 106 will either confirm or not confirm the false identity and/or the synthetic identity. The relying party 106 is further configured to maintain records of fraudulent activities, specially associated with particular parties, for example, involving accounts issued by the relying party 106, etc., when confirmed. And, at one or more regular, or irregular, intervals, the relying party 106 is configured to report confirmed instances of false or synthetic identities to the identity network 102, whereby the instances (inclusive of all the related identity attributes, or at least a portion thereof) are disclosed to the identity network 102. In response to these instances reported from the relying party 106 (and other relying parties), the identity network 102 is configured to compile a data structure 110 of such instances, and of particular identity attributes associated with the confirmed fraud instances (e.g., particular identity attributes of the identities associated with the fraudulent merchants (or principal owners), referred to herein as terminated merchants (or principal owners), and which may be merchants (or principle owners) that have been terminated (from the relying party 106) upon a conclusion of fraud or other nefarious activity (e.g., at any time ever, within the last five years, within the last year, within another time frame, etc.), etc.). The data structure 110 may further include identified parties as inquired merchants (or principal owners), for which the relying party 106 (or another relying party) has inquired about the status of the merchants (or principle owners) (e.g., as either fraudulent or not, etc.) (e.g., at any time ever, within the last five years, within the last year, within another time frame, etc.). This may include a comprehensive listing of parties for which the relying party 106 and other relying parties have inquired about the status of the merchants.

The data structure 110 compiled by the identity network 102 may be part of the identity network 102, or it may be separate therefrom (e.g., part of another entity, etc.).

The data structure 110 may include multiple types of instances of false or synthetic identities, including, for example, a listing of exposed or breached identity attributes (e.g., a listing of stolen EINs, federal tax IDs, state tax IDs; a listing of known fake addresses; a listing of known fake merchants and/or principal owners names; listings of terminated merchants and/or principal owners; connections therebetween (e.g., which EINs were associated with which fake merchants and/or principal owners, etc.), etc.) (e.g., as found on the dark web, etc.). The data structure 110 may further include a pattern data structure, which includes patterns of fraud and loss activities for particular parties, such as parties (or particular names, addresses, etc. associated therewith) involved in numerous reported and/or repeated instances of fraud or illegal activities, etc. The data structure 110 may be populated from reports from associated entities (e.g., the relying party 106, other relying parties, the asserting party 104, etc.), or potentially through other resources (e.g., as found on the dark web, etc.).

It should also be appreciated that the asserting party's interactions (and other asserting party's interactions) with the relying party 106 may extend through one or more different phases. Initially, for example, the relying party 106 may be configured to onboard the asserting party 104, whereby the asserting party 104 is investigated and determined to be trustworthy to the extent that the relying party 106 will extend an account or other services to the asserting party 104. Further, in another phase, the relying party 106 may be configured to evaluate ongoing activities of the asserting party 104, and/or to investigate, from time to time, accusations and/or indications of a false or synthetic identity associated with the asserting party 104, whereby the relying party 106 will either confirm or not confirm the false identity and/or the synthetic identity. In such phases, the relying party 106 may be configured to employ one or more verification procedures internally, but still configured to request a score or metric indicative of the validity of the identity of the asserting party 104 from the identity network 102 (in accordance with the present disclosure). That said, the request received by the relying party 106 from the asserting party 104 may relate to one or more services and/or products provided by the relying party 106 (e.g., a new account, transaction processing as part of clearing and settlement, etc.).

What's more, the user 108 in the system 100 is associated with a payment account that allows the user 108 to purchase one or more products from merchants, including the asserting party 104. The user 108 is also associated with an identity that, for purposes herein, is not a false or synthetic identity (i.e., the user 108 is not a fraudster).

When the user 108 desires to purchase a product from the asserting party 104, the user 108 may present credentials for his/her payment account to the asserting party 104 (e.g., by way of a payment card (or other payment device), an electronic wallet, verbally, etc.). In response, the asserting party 104 is configured to receive the payment account credentials (e.g., a primary account number (PAN), an expiration date for a related payment device, a CVC, etc.), and potentially other information about the user 108 (e.g., a shipping address for online orders, a phone number, etc.). The asserting party 104 is further configured to compile and transmit an authorization request for the transaction to an acquirer (e.g., the relying party 106, etc.), who passes the authorization request to an issuer of the user's payment account through a payment network for authorization (whereby in various implementations the issuer and/or the payment network may also be a relying party).

In the above example (and as generally noted), the relying party 106 in the system 100 may be the acquirer or the issuer (or even the payment network). In one aspect, when the relying party 106 is the acquirer (as generally described above), the relying party 106 may seek a verification of the identity of the asserting party 104 from the identity network 102 (e.g., to verify identity attributes of the asserting party's identity and a prior history of the asserting party 104 and its identity, etc.), prior to onboarding the relying party 106 (e.g., in response to a request by the relying party 106 for an account from the acquirer, etc.). The relying party 106 may also be configured to employ one or more verification procedures internally, but is still configured to request an assessment of the validity of the identity of the asserting party 104 from the identity network 102. In connection therewith, the relying party 106 is configured to transmit a request including at least a portion of the identity data received from the relying party 106 as part of the onboarding request, such as, for example, a name of the relying party 106, a mailing address of the relying party 106, a merchant ID or EIN number for the relying party 106, an MCC for the relying party 106, etc.

In another aspect, when the relying party is either the acquirer or the issuer (or even the payment network), the relying party 106 may seek a verification of the identity of the asserting party 104 from the identity network 102 at the time the asserting party 104 submits an authorization request for a transaction. Here, when the authorization request is received (either from the asserting party 104 or from the payment network), the relying party 106 (either the acquirer or the issuer) is configured to seek a verification of the identity of the asserting party 104 (and potentially, the user 108) from the identity network 102, for example, in connection with suspicious authorization behavior (e.g., multiple authorization requests for a same transaction amount within a defined time interval, multiple authorization requests involving a same payment account within a defined time interval, multiple authorization request relating to refunds, etc.). Again, as above, the relying party 106 may be configured to employ one or more verification procedures internally, but is still configured to request an assessment of the validity of the identity of the asserting party 104 from the identity network 102. In connection therewith, the relying party 106 is configured to transmit a request including at least a portion of the identity data received from the relying party 106 as part of the authorization request, such as, for example, a name of the relying party 106, a mailing address of the relying party 106, a merchant ID or EIN number for the relying party 106, an MCC for the relying party 106, etc.

In turn, the identity network 102 is configured to receive the request and to store the identity data included in the request, as linked to the asserting party 104, in memory (e.g., memory associated with the data structure 110, other memory, etc.). The identity network 102 is then configured to generate a score or metric for the identity presented by the asserting party 104 to the relying party 106.

Specifically, in this exemplary embodiment, the identity network 102 includes three separate scoring engines 112, 114, and 116, which may each calculate a particular score relating to the presented identity. The scoring engine 112, for example, is configured to generate a score based on some identifying data included in the request being included in a known stolen data listing in memory. For example, where the EIN 123-456-789 has been seen in multiple instances of fraud, and has been confirmed as stolen (and is included in the listing in memory at the identity network 102), the engine 112 is configured to generate a score based on the inclusion of that EIN in the request from the relying party 106. Further, the scoring engine 114 is configured to generate a profile score based on the relation of the current transaction or multiple transactions involving the asserting party 104 to patterns of transaction data known to have resulted in fraud or loss. This may include, for example, comparing the current transaction(s) to transactions linked to confirmed fraud cases reported by issuing/acquiring banks and/or payment networks. In connection therewith, the patterns may relate to a combination of particular transaction amounts, dates/times, merchant names, merchant categories, merchant contact details, and particular types of fraud that are known to have involved cases of fraud or loss.

And, the scoring engine 116 is configured to generate a score based on a relationship of the asserting party 104 to other known bad actors. This score may provide an indication of whether or not the asserting party 104 is a collusive merchant (e.g., are bad actors at the asserting party 104 stealing consumer identities and payment information (in connection with legitimate transactions at the asserting party 104) to build new synthetic identities; is the asserting party 104 susceptible to vulnerability from such bad actors; etc.). In generating this score, the scoring engine 116 may track sources of breached data (e.g., where a pattern of breached data originates from the asserting party 104, etc.) and may track identity attributes of merchant principal owners of the asserting party 104 (e.g., are such attributes associated with known instances of fraud, etc.).

Then, once the separate scores are generated by one or more of the scoring engines 112-116, the identity network 102 is configured to aggregate the generated scores, either weighted or not, into the assessment score or metric.

Additionally, or alternatively, in various embodiments, in generating the score, the identity network 102 may be configured to determine attribute commonality of the attributes of the identity of the asserting party 104 to attributes of fraudulent identities included in the data structure 110. In so doing, the identity network 102 may be configured to identify (or to locate or to search for) one or more of the identity attributes of the identity of the asserting party 104 in the data structure 110 and, if present, then determine a number of links between the attributes for the asserting party 104 and other merchants (including both inquired merchants and terminated merchants) (e.g., which may represent a number of common (or shared) attributes between the identity of the asserting party 104 and attributes of fraudulent identities included in the data structure 110, etc.). It should be appreciated that the identity network 102 may be configured to determine the attribute commonality in a variety of manners.

In addition to searching in the data structure 110 for the attributes of the identity of the asserting party 104, the identity network 102 is configured to also search for the attributes among common fraudulent identities on one or more parts of the internet that are not indexed by search engines, sometimes referred to as the "deep web" (e.g., directly, or via a third party provider whereby the third party provider may then search on behalf of the identity network 102 (and provide the search results to the identity network 102); etc.). For instance, the identity network 102 may search the deep web, the dark web, the invisible web, or the hidden web, etc. (all broadly the deep web).

Thereafter, based on the search results, the identity network 102 is configured to compile a score for the asserting party 104 along with a profile for the asserting party 104 (and, in some embodiments, a profile for principle owners of the asserting party 104, etc.), which includes, for example, one or more details of the number of new merchants having the same attribute(s) in a given period, a number of terminated merchants having the same attribute(s) in a given period, a number of occurrences or hits for the attribute(s) on the deep web, etc. This may be in addition to the score generated by the scoring engines 112-116, or a part thereof.

Regardless of the scoring above, the identity network 102 is configured to then transmit and/or report, in response to the request, the metric or score or risk score and, potentially, the profile to the relying party 106. In turn, the relying party 106 may decide to terminate its relationship, transaction, or interaction with the asserting party 104, or not, depending on the metric or score and/or the profile of the asserting party 104 (e.g., based on a comparison of the risk score to a threshold, potentially in combination with its own determination; etc.).

While only one identity network 102, one asserting party 104, one relying party 106, and one user 108 are illustrated in FIG. 1, it should be appreciated that any number of these entities (and their associated components), and any number of different types of users and/or parties, may be included in the system 100, or may be included as a part of systems in other embodiments, consistent with the present disclosure. In addition, while three scoring engines 112-116 are illustrated as part of the identity network 102, it should be appreciated that any number of scoring engines may be included therein within the scope of the present disclosure (e.g., less than three engines, more than three engines, etc.).

Figure 2:
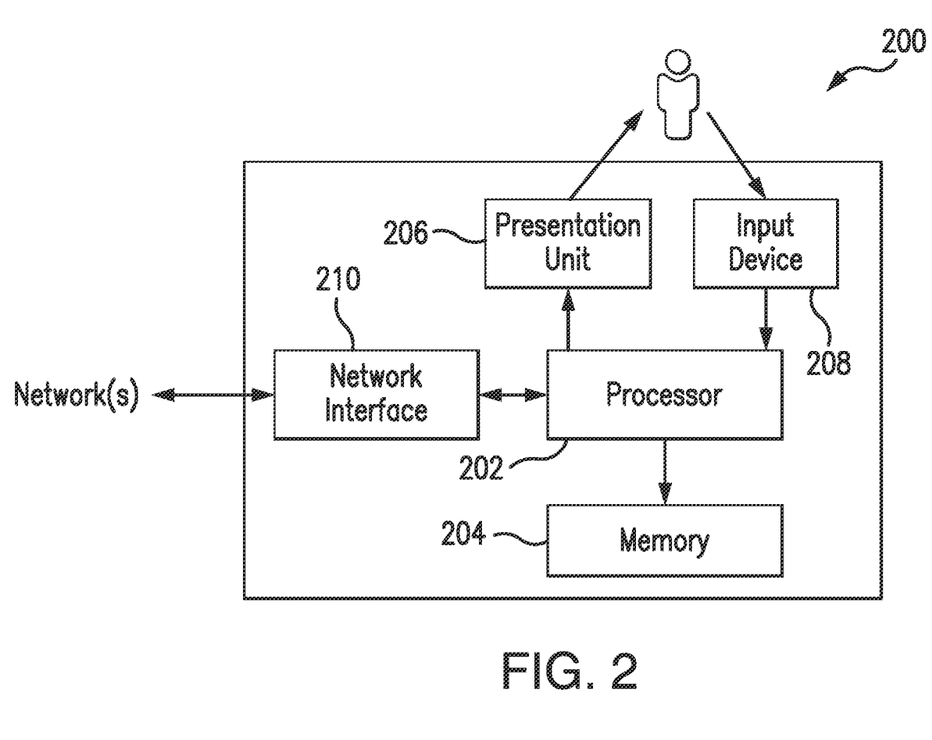
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, the identity network 102 (and each of the engines 112-116 associated therewith), the asserting party 104, the relying party 106, and the data structure 110 may each be included in (and/or may include) and/or may each be implemented in a computing device, consistent with and/or similar to the computing device 200, coupled to (and in communication with) one or more networks. In addition, the engines 112-116 and the data structure 110 may each (in any combination, or separately) be included in a computing device of the identity network 102, or one or more of the engines 112-116 and the data structure 110 may be separate and/or standalone therefrom. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity data for users and other parties (including one or more profiles for such other parties), attributes of identities, histories of identities, confirmed fraudulent and complicit and/or collusive party listings, fraud profiles, synthetic party identity assessment metrics and/or scores, listings of terminated parties (e.g., merchants, etc.), listings of inquired parties (e.g., merchants, etc.), and/or other types of data (and/or data structures) suitable for use as described herein.

Furthermore, in various embodiments, computer-executable instructions may be stored in the memory 204 for execution by the processor 202 to cause the processor 202 to perform one or more of the operations described herein (e.g., one or more of the operations described in method 300, etc.), such that the memory 204 is a physical, tangible, and non-transitory computer readable storage media. Such instructions often improve the efficiencies and/or performance of the processor 202 and/or other computer system components configured to perform one or more of the various operations herein, whereby the instructions effectively transform the computing device 200 into a special purpose device configured to perform the unique and specific operations described herein. It should be appreciated that the memory 204 may include a variety of different memories, each implemented in one or more of the operations or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., synthetic party identity assessment metrics, etc.), visually or audibly, for example, to a user of the computing device 200 (e.g., a user associated with the relying party 106, etc.), etc. And, various interfaces (e.g., as defined by one or more websites, etc.) (e.g., including instructions to capture attributes of a user's identity, etc.) may be displayed at computing device 200, and in particular at presentation unit 206, to display certain information to the user of the device. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

In addition, the computing device 200 includes an input device 208 that receives inputs from the user (i.e., user inputs) of the computing device 200 such as, for example, requests for fraud scoring, requests for transactions with the asserting party 104, etc., in response to prompts from a network based application, website, etc., as further described below. The input device 208 may include a single input device or multiple input devices. The input device 208 is coupled to (and is in communication with) the processor 202 and may include, for example, one or more of a keyboard, a pointing device, a mouse, a stylus, a camera, a biometric reader (e.g., a fingerprint scanner, etc.), a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a radio-frequency (RF) adapter, a mobile network adapter, etc.), or other device capable of communicating to one or more different ones of the networks herein and/or with other devices described herein. In some exemplary embodiments, the computing device 200 may include at least one processor (e.g., the processor 202, etc.), at least one memory (e.g., the memory 204, etc.), and/or one or more network interfaces (e.g., network interface 210, etc.) included in, or incorporated into or with the at least one processor.

Figure 3:
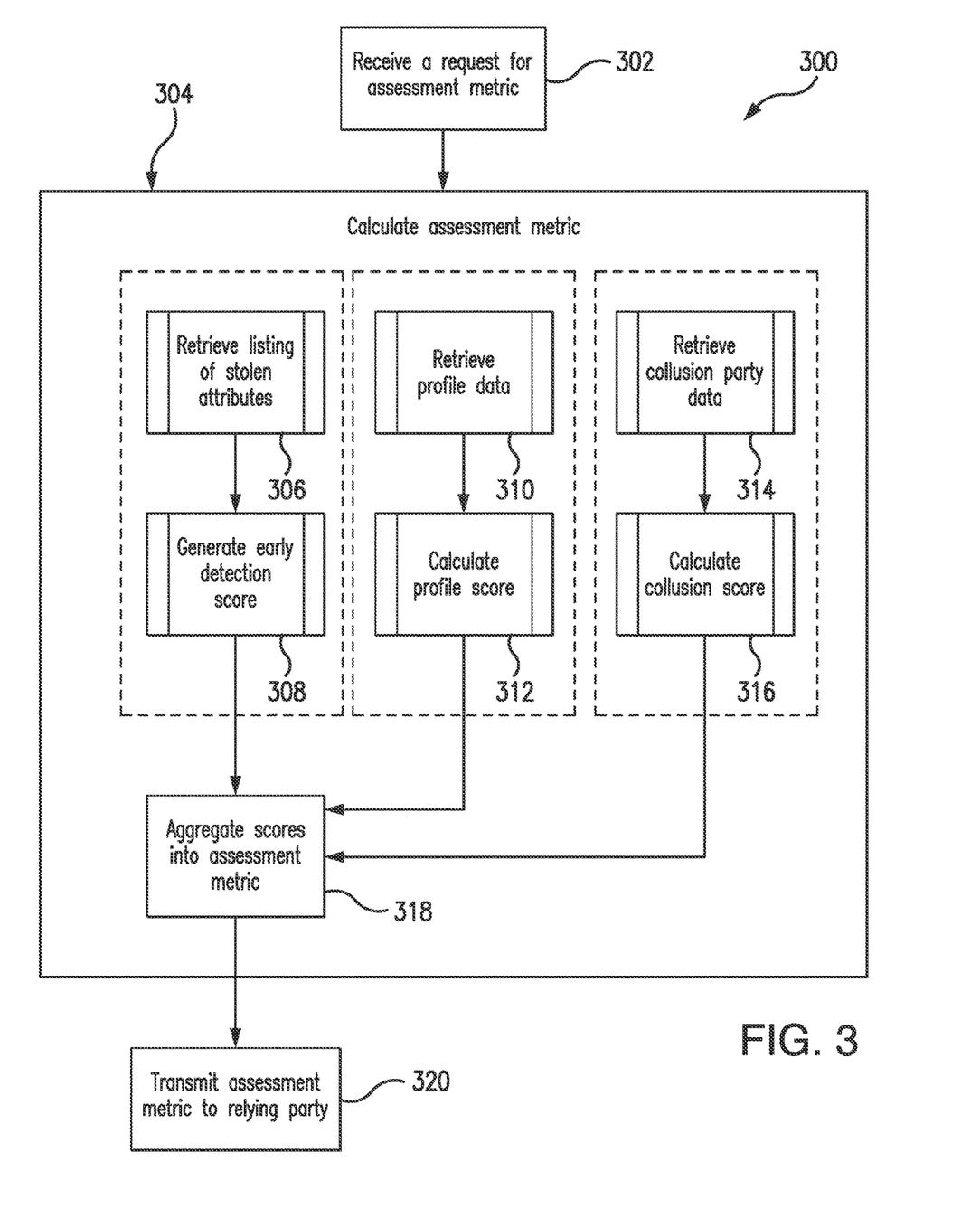
FIG. 3 includes a flow diagram of an exemplary method, which may be implemented in connection with the system of FIG. 1, for determining an assessment metric for an identity of a party, where the assessment metric is indicative of a likelihood that the identity presented by the party is a synthetic identity.

FIG. 3 illustrates an exemplary method 300 for use in determining an assessment metric for an identity presented, for example, by an asserting party to a relying party as part of a network communication, where the metric is indicative of the likelihood (or not) that the identity is a synthetic party identity. The exemplary method 300 is described as implemented in the identity network 102 of the system 100. And, reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

In the method 300, it should be understood, as described above, that the asserting party 104 is a merchant and is a fraudster and has built a synthetic identity over a period of weeks, months or years. In particular, as used herein, the synthetic identity for the asserting party 104 includes a real EIN (or Federal Tax ID) of 123-456-789 and, for a real social security number (SSN) of 987-65-4321 for a principle owner (or manager, etc.) of the asserting party 104. These two attributes are both real (or valid), as they are tied to a legitimate entity and a real individual, respectively. The synthetic identity then includes a fake name (e.g., Buy Now, Inc.) and a fake address (e.g., 1111 Shady Lane). Additionally, the stolen identity attributes (including the EIN and the SSN) are combined with a fake set of online offerings, for example, for travel/entertainment booking, and related contact information (phone/email information that is actually associated with the asserting party 104), whereby the asserting party 104 is able to secure a bank account with an acquirer and a payment terminal/mechanism with a payment processor (e.g., Stripe, Square, etc.). In this way, by being able to secure a bank account and payment processing technology based on the synthetic identity, the asserting party 104 may have a significant opportunity for initiating large amounts of fraudulent transactions in a short time frame.

Given the above, the user 108 may attempt a transaction with the asserting party 104, for the purchase of one or more products (e.g., airline tickets, etc.). As such, the user 108 presents a payment account credential to the asserting party 104, which in turn, generates an authorization request for the transaction (including the credential) and transmits the authorization request to an acquirer associated with an account issued to the asserting party 104. The acquirer, in turn, transmits the authorization request to an issuer of the payment account of the user 108, via a payment network, whereby the transaction may be approved or declined. It should be appreciated that when the relying party 106 herein is the acquirer in the above sequence, the acquirer may halt the authorization request and transmit a request for an assessment metric for the asserting party 104 to the identity network 102, prior to transmitting the authorization request on to the payment network and/or issuer (or may do so at the same time, whereby the acquirer may subsequently halt the transaction through an authorization reply transmitted by the issuer in response to the authorization request (where the authorization reply then includes an indication from the issuer approving or declining the transaction)). Conversely, where the relying party 106 is the issuer of the payment account to the user 108, the issuer may transmit the request for the assessment metric to the identity network 102 upon receipt of the authorization request (and, potentially, hold the authorization request until a response from the identity network 102 is received).

With reference to FIG. 3, regardless of whether the relying party 106 is the issuer or the acquirer in the above transaction (and regardless of when the relying party 106 transmits the request to the identity network 102), the identity network 102 receives the request for the assessment metric from the relying party 106, at 302, and calculates the assessment metric for the identity, at 304, where the metric is indicative of a likelihood that the identity provided by the asserting party 104 (e.g., in the authorization request for the transaction, etc.) is a synthetic party identity (or not). In this exemplary embodiment, the calculation of the assessment metric (at 304) is separated into multiple sub-operations in which multiple different scores are generated (or calculated), each including and/or utilizing varying combinations of data and each calculated by a different one of the scoring engines 112-116.

Specifically in the method 300, the scoring engine 112 retrieves, at 306, a listing of stolen identity attributes from memory (e.g., the memory 204, etc.) of the identity network 102 (i.e., a listing of identity attributers known to be stolen).

The listing of stolen identity attributes includes, as explained above, attributes known by the identity network 102 to be compromised (e.g., either reported as stolen, or used in fraudulent activities, or identified on the dark web, etc.). The scoring engine 112 then calculates, at 308, an early detection score for the provided identity of the asserting party 104 (e.g., on a scale of 0 to 1000, etc.) based on the appearance or not of the attributes of the identity of the asserting party 104 in the listing. For instance, a weighted decision matrix (e.g., a weighted scoring model, etc.) may be utilized as part of a multiple-criteria decision analysis to generate the score. In so doing, then, the scoring engine 112 may evaluate the EIN and the SSN attributes of the identity of the asserting party 104, whereby (based on the matrix (or model)) presence of the EIN on the dark web may have a generally low impact on the score (e.g., a value of 50, etc.) while prior use of the EIN by previously terminated merchants may have a generally high impact on the score (e.g., a value of 500, etc.). Similarly, (based on the matrix (or model)) presence of the SSN on the dark web may have a generally low impact on the score (e.g., a value of 25, etc.) while prior use of the SSN by an owner associated with a previously terminated merchant may have a generally high impact on the score (e.g., a value of 300, etc.). The resulting values may then be summed to provide the resulting score (e.g., 50+500+25+300=875).

Next, or at the same time, or prior (again, in response to the request from the relying party 106), the scoring engine 114 retrieves, at 310, profile data for fraud and loss from memory (e.g., the memory 204, etc.) of the identity network 102. This may include, for example, comparing the current transaction(s) to transactions linked to confirmed fraud cases reported by issuing/acquiring banks and/or payment networks. The profiles for fraud and loss may also include one or more patterns of transaction data associated with fraud and loss activities, and the pattern(s) of transaction data associated with fraud and loss activities may include a combination of two or more of: a transaction amount, a date, a time, a merchant name, a merchant category, and a merchant contact detail.

In connection therewith, the scoring engine 114 may compare the specific details of a current transaction (or group of transactions) to a combination of particular transaction amounts, dates/times, merchant names, merchant categories, merchant contact details, and particular types of fraud associated with the transactions linked to the confirmed fraud cases (broadly, pattern(s)). And, once the profile data for fraud and loss is retrieved, the scoring engine 114 then calculates, at 312, a profile score indicative of the consistency of the transaction and/or the asserting party 104 with known patterns of fraud and loss (e.g., on a scale of 0 to 1000, etc.). Again, a weighted decision matrix (e.g., a weighted scoring model, etc.) may be utilized as part of a multiple-criteria decision analysis to generate the score. For instance, for the transaction by the user 108 for the airline tickets, where the transaction data for the transaction includes the EIN for the asserting party 104 and a transaction amount of $450, the presence of the EIN in one of the known patters of fraud may have a generally high impact on the score (e.g., a value of 350, etc.) while the presence of the transaction amount of $450 in one of the known patterns of fraud may have a generally low impact on the score (e.g., a value of 20, etc.). What's more, the presence of the EIN and the amount of $450 in the same known pattern may have a generally high impact on the score (e.g., a value of 300, etc.). The resulting values may then be summed, again, to provide the resulting score (e.g., 350+20+300=670).

And, at the same time, or prior or later (again, in response to the request from the relying party 106), the scoring engine 116 retrieves, at 314, data (or profiles) relating to parties (e.g., individuals, merchants, etc.) known to have been involved in fraudulent actions (e.g., transactions, etc.) or known to have been terminated (e.g., from an acquirer, payment network, issuer, etc.) for fraud. The scoring engine 116 then calculates, at 316, a collusion score for the provided identity of the asserting party 104 (e.g., on a scale of 0 to 1000, etc.). For instance, the scoring engine 116 may generate the collusion score based on a relationship of the asserting party 104 to one or more of the parties identified in the retrieved data. The score, then, may be based on a number of identified parties to which the asserting party 104 is related, and/or a fraud extent (e.g., a type of fraud, a number of fraud instances, etc.) for the identified parties to which the asserting party 104 is related. And, again, a weighted decision matrix (e.g., a weighted scoring model, etc.) may be utilized as part of a multiple-criteria decision analysis to generate the score. For instance, identification of two employees of the asserting party 104 known to have been involved in fraudulent transactions may have a generally high impact on the score (e.g., a value of 500, etc.).

In the above, in retrieving the various different data and calculating the corresponding scores (at 306-316), the scoring engines 112-116 (e.g., a processor associated therewith, etc.) may retrieve the particular data from the request, or the identity network 102 (e.g., a processor associated therewith, etc.) may extract the particular data from the request and transmit it to the scoring engines 112-116.

Then in the method 300, once the scores from the different scoring engines 112-116 are generated, the identity network 102 aggregates the scores, at 318, into the assessment metric (e.g., again on a scale of 0 to 1000, etc.). The scores may be aggregated into the assessment metric by simply averaging the scores, adding the scores, etc. What's more, the individual scores may be weighted in the aggregation, such that one of the scores may have more impact on the assessment metric than another. It should be appreciated that the weighting of the different scores may vary depending on the identity network 102, the asserting party 104, the relying party 106 or even the user 108.

And, following the aggregation, the assessment metric is transmitted, by the identity network 102, at 320, to the relying party 106. Thereafter, the relying party 106 receives the assessment metric, evaluates the assessment metric (e.g., against a threshold, etc.), and may rely on the assessment metric to proceed in the transaction, or not. For instance, the relying party 106 may compare the assessment metric to a threshold and decline further interaction with the asserting party 104 if the assessment metric fails to satisfy the threshold (e.g., decline any transaction or application if the assessment metric is less than 800, etc.). What's more, the relying party 106 may report the asserting party 104 as a potentially fraudulent merchant, collusive merchant, etc., whereby the relying party 106 or another entity may engage in further investigation of the asserting party 104, etc. Additionally, or alternatively, the relying party 106 may compare the assessment metric to multiple thresholds, and again decline the transaction with the asserting party 104 if the assessment metric fails to satisfy a first threshold (e.g., if the assessment metric is above 500, but less than 800, etc.) and further implement additional security or review of the asserting party 104 if the assessment metric is within a second threshold (e.g., implement the additional fraud review of the asserting party 104 if the assessment metric is above 800, etc.).

Figure 4:
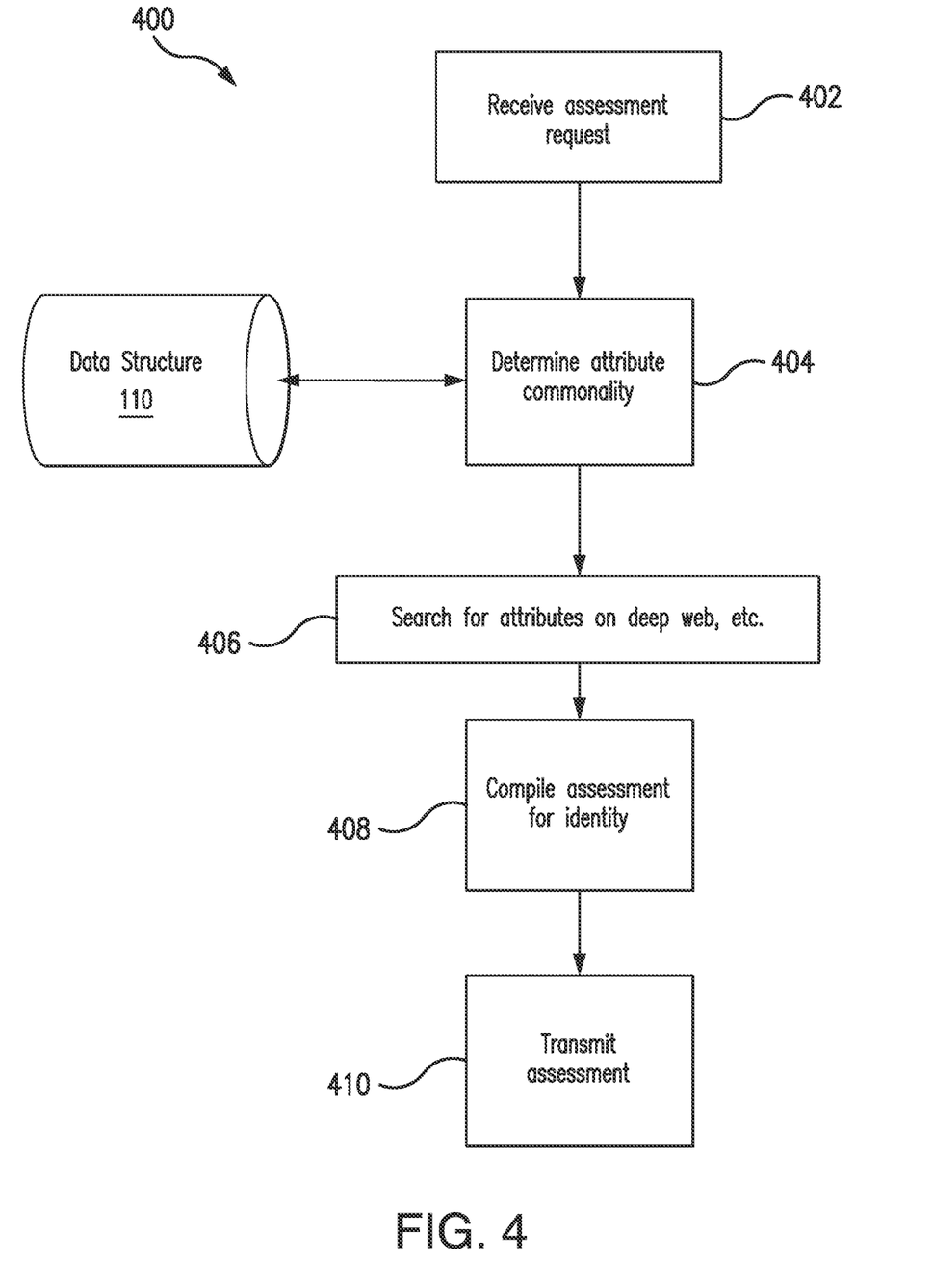
FIG. 4 includes a flow diagram of another exemplary method, which may be implemented in connection with the system of FIG. 1, for identifying a synthetic identity associated with a network request (broadly, a network communication)

FIG. 4 illustrates an exemplary method 400 for use in identifying synthetic identities associated with network requests. The exemplary method 400 is described as implemented in the identity network 102 of the system 100. And, reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 400.

In the method 400, it should be understood, as described above, that the asserting party 104 is a merchant and is a fraudster associated with a synthetic identity. As an example, the synthetic identity for the asserting party 104 includes a real EIN (or Federal Tax ID) of 123-456-789 and a real social security number (SSN) of 987-65-4321 for a principle owner (or manager, etc.) of the asserting party 104. These two attributes are both real (or valid), as they are tied to a legitimate entity and a real individual, respectively (neither of which, though, is the asserting party 104 or the principle owner of the asserting party 104). The synthetic identity then includes a fake name (e.g., Buy Now, Inc.; etc.) and a fake address (e.g., 1111 Main Street, etc.). Additionally, the stolen identity attributes (including the EIN and the SSN) and the fake identity attributes are combined with a fake set of online offerings, for example, for travel/entertainment booking, and related contact information (phone/email information that is actually associated with the asserting party 104), whereby the asserting party 104 is either requesting a bank account to receive funds for purchases and/or is simply desiring to continue to have the bank account to receive funds as part of transactions by users for the online offerings. It should further be appreciated that the identity network 102, as above, is associated with and/or includes the data structure 110 having the various listings of fraudulent merchants (including inquired merchants) and/or principal owners and associated identity attributes, etc.

Given the above, the asserting party 104 initiates a request to the relying party 106. As above, the request may include a transaction request (e.g., an authorization request involving a purchase of one or more of the online offerings by the user 108, etc.), or may include a request to be on-boarded and/or to open an account with the relying party 106 (all of which may broadly include a network request). The request includes, for example, a number or token associated with an account already issued to the asserting party 104 (e.g., where the request relates to an authorization request for a transaction, etc.) and/or identity details of the asserting party 104 and/or a principle owner thereof (e.g., where the request relates to onboarding the asserting party 104 to the relying party 106 for a new account, etc.), including, without limitation, a name, a mailing address, an email address, a phone number, a government issued number (e.g., a driver's license number, national ID numbers, local, state and/or federal tax ID numbers, an EIN, a SSN, etc.), names and addresses (e.g., for owners or operating officers/employees, etc.), etc. In response to the request, the relying party 106 submits a request for an assessment score to the identity network 102.

It should be appreciated that the relying party 106 may submit such a request for an assessment score to the identity network 102 for the identity provided by the asserting party 104 in connection with every request received from the asserting party 104 (e.g., in response to a request by the asserting party 104 for a new account from the relying party 106 and then in response to each authorization request originating from the asserting party 104 for transactions involving the asserting party 104, etc.). Or, the relying party 106 may submit such a request to the identity network 102 at one or more intervals (e.g., one or more predefined intervals, one or more random intervals, etc.). Or, the relying party 106 may submit such a request to the identity network 102 in response to an allegation or suspicion that the identity associated with the asserting party 104 is fraudulent, etc.

In any case, in response to the request, as shown in FIG. 4, the identity network 102 receives, at 402, the assessment request from the relying party 106 (e.g., via a computing device 200 as associated with the identity network 102, etc.) and then determines, at 404, attribute commonality between the identity associated with the asserting party 104 and the various merchants included in the data structure 110 (e.g., via a processor 202 included at the identity network 102, etc.). As described above in the system 100, the merchants included in the data structure 110 may include a number of inquired merchants (e.g., merchants for which an inquiry has been submitted, etc.) and terminated merchants (e.g., merchants that have been terminated (e.g., by the relying party 106, etc.) upon confirmation of fraud or other nefarious activity, etc.).

Figure 5:
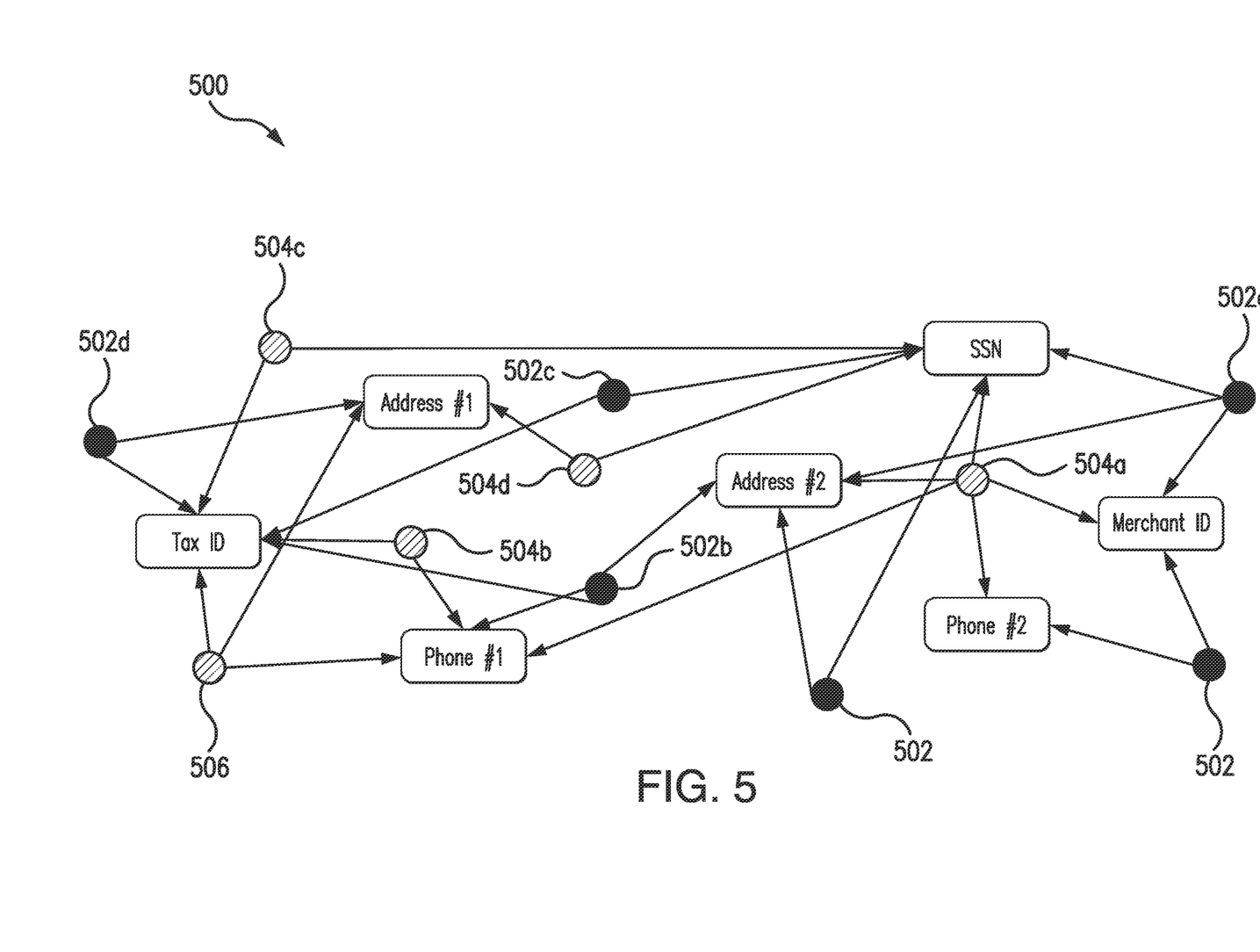
FIG. 5 is a diagram of links indicating commonality of attributes between multiple asserted identities, which may be used in connection with the method of FIG. 4 to identify the synthetic identity.

An exemplary representation of determinations of commonality, as may be generated by the identity network 102, is shown in FIG. 5. As shown, the identity network 102 may include a commonality diagram 500, for example, stored in the data structure 110. Various attributes are included in the diagram 500, such as, for example, addresses, phone numbers, ID numbers, etc. Such attributes include those that have been previously identified to (or by) the identity network 102 as being associated with fake or synthetic identities of merchants (or other entities). And, when an inquired/terminated merchant includes one of the attributes in the diagram 500 (e.g., a same phone number or SSN as included in the diagram 500, etc.), a node representative of the inquired/terminated merchant is connected to the attribute. The identity network 102 may continuously update the diagram 500 as needed, for example, as additional new attributers are received and/or identified (as being associated with identities of inquired or terminated merchants, etc.). In FIG. 5, each inquired merchant is identified by a solid-filled circle node 502, and each terminated merchant is identified by a hash-filled circle node 504. For example, in the illustrated diagram 500, terminated merchant 504a shares a same SSN, Merchant ID, and address (Address #2) as inquired merchant 502a.

In connection therewith, in determining the attribute commonality for the identity of the asserting party 104, with the inquired and terminated merchants included in the data structure 110 (at 404), the identity network 102 may add the asserting party 104 to the diagram 500 of the inquired merchants 502 and terminated merchants 504 (and/or principal owners) (in the data structure 110) and then count the links to inquired merchants and/or terminated merchants (and/or principal owners). In this example, the asserting party 104 is added to the diagram 500, as identified by a clear circle node 506, based on a common phone number (Phone #1) with two terminated merchants 504a-b and one inquired merchant 502b, a common tax ID with two terminated merchants 504b-c and three inquired merchants 502b-d, and a common address (Address #1) with one terminated merchant 504d and one inquired merchant 502d. As such, in this example, the asserting party 104, in general, has links to three different inquired merchants 502b-d and links to four different terminated merchants 504a-d. And, more specifically, the asserting party 104 has one link with inquired merchant 502b, one link with inquired merchant 502c, and two links with inquired merchant 502d. And, the asserting party 104 has one link with terminated merchant 504a, two links with terminated merchant 504b, one link with terminated merchant 504c, and one link with terminated merchant 504d.

Referring again to FIG. 4, after, or prior to, determining the attribute commonality (or commonalities) (e.g., the number of links, etc.) for the asserting party 104, the identity network 102 searches, at 406, for the identified common attributes (from the attribute commonality determination) (or, in some embodiments, all attributes of the identity of the asserting party 104) on the deep web, etc. (as is generally known to those skilled in the art). As discussed above, the deep web may include one or more parts of the internet that is not indexed by search engines. For instance, again, the identity network 102 may search the deep web, the dark web, the invisible web, or the hidden web, etc., either directly or indirectly (e.g., via a third party provider whereby the third party provider may then search on behalf of the identity network 102, etc.).

In one or more embodiments, the search of the dark web is conditioned on the attribute commonality determined by the identity network 102. For example, if a number of links to an attribute of inquired merchants or to terminated merchants satisfies a threshold, the identity network 102 (or other third party on behalf of the identity network 102) may then search the deep web, but not when the number of links does not satisfy the threshold. The limitation may additionally or alternatively be based on the type of attribute commonality (e.g., SSN versus phone number, etc.). For example, the identity network 102 may always search the deep web (or cause such a search to be performed) when a link to a SSN is determined, but only based on the threshold when links(s) to a phone number or address is determined.

Thereafter, the identity network 102 compiles, at 408, an assessment for the identity included in the request, i.e., the identity of the asserting party 104. The assessment may include a number of links to inquired merchants (e.g., a sum of total links, etc.), a number of links to terminated merchants (e.g., a sum of total links, etc.), and/or a hit for one or more attributes on the deep web, etc.

In connection therewith, the assessment may include a qualitative representation of the number of links to inquired merchants, the number of links to terminated merchants, and/or the hits for one or more attributes on the deep web, etc. For instance, in the above example (described with reference to the commonality diagram 500 of FIG. 5), the asserting party 104 has one link with inquired merchant 502b (based on the same Tax ID), one link with inquired merchant 502c (based on the same Tax ID), and two links with inquired merchant 502d (based on the same Tax ID and the same Address #2). Additionally, the asserting party 104 has one link with terminated merchant 504a (based on the same Phone #1), two links with terminated merchant 504b (based on the same Tax ID and the same Phone #1), one link with terminated merchant 504c (based on the same Tax ID), and one link with terminated merchant 504d (based on the same Address #1). As such, the identity network 102 may include in the assessment an indication that the asserting party has identified records (or links) to three different attributes that are the same as other merchants (the Tax ID, the Phone #1, and the Address #1). The identity network 102 may also (or alternatively) include in the assessment an indication that the asserting party 104 has five identified records (or links) with the same Tax ID, three identified records (or links) with the same Phone #1, and two identified records (or links) with the same Address #1.

In addition (or alternatively) to the qualitative representation, the assessment may include a quantitative representation of the number of links to inquired merchants, the number of links to terminated merchants, and/or the hits for one or more attributes on the deep web, etc. For instance, the identity network 102 may assign a value of 100 for each link the asserting party 104 has with a terminated merchant, and a value of 50 for each link the asserting party 104 has with an inquired merchant. Additionally, the identity network 102 may assign a further value of 100 for each attribute of the asserting party 104 identified on the deep web. As such, in the above example (described with reference to the commonality diagram 500 of FIG. 5), the asserting party 104 has one link with inquired merchant 502*b*, one link with inquired merchant 502*c*, and two links with inquired merchant 502*d*. The identity network 102 may thus assign a value of 200 based on the four total links the asserting party 104 has with inquired merchants. And, the asserting party 104 has one link with terminated merchant 504*a*, two links with terminated merchant 504*b*, one link with terminated merchant 504*c*, and one link with terminated merchant 504*d*. The identity network 102 may thus assign a value of 500 based on the five total links the asserting party 104 has with terminated merchants. Further, the identity network 102 (or a third party on behalf of the identity network 102) may search the deep web and identify the tax ID number for the asserting party 104, and assign a value of 50 thereto. The identity network 102 then sums the values, in this example, for a final score of 750 (e.g., on a scale of 1-1000, where all scores are capped at 1000; etc.).

The assessment may be provided in a report or graphic form. In either case, in various embodiments, the identity network 102 may further include an indication (or determination) in the assessment as to whether or not the identity of the asserting party 104 is fake or synthetic. Such indication (or determination), when included, may be based on a comparison of the qualitative representation and/or the quantitative representation to one or more thresholds. With regard to the qualitative representation, this may include comparing each of the identified records to a threshold of three and, when the number of such identified records exceeds the threshold, indicating (or determining) the identity of the asserting party 104 to be fake or synthetic (or, in general, fraudulent). As such, in the above example where the asserting party 104 has five identified records (or links) with the same Tax ID, three identified records (or links) with the same Phone #1, and two identified records (or links) with the same Address #1, the identity network 102 may determine the identity of the asserting party 104 to be fake or synthetic because it has five identified records (or links) with the same Tax ID (which exceeds the threshold of three). And, with regard to the quantitative representation, the identity network 102 may compare the final score to a threshold of 700 and, when the final score exceeds the threshold, indicate (or determine) the identity of the asserting party 104 to be fake or synthetic (or, again in general, fraudulent). As such, in the above example where the final score for the identity of the asserting party 104 is 750, the identity network 102 may determine the identity of the asserting party 104 to be fake or synthetic because the final score of 750 exceeds the threshold of 700.

It should be appreciated that other factors may be taken into account in other examples in evaluating links between the asserting party 104 and other merchants. In addition, it should be appreciated that, in generating the quantitative representation, different scores may be assigned to the factors in other examples, and that scores for other combinations of factors may be used. Further, it should be appreciated that in generating such quantitative representation, the individual values may be combined differently in other embodiments to generate the final score (e.g., one or more of the values may be weighted prior to being added to other values to generate the final score, etc.). It should also be appreciated that other thresholds (and/or combinations of thresholds) may be used in other examples.

Then in the method 400, when compiled, the assessment is transmitted, by the identity network 102, to the relying party 106, at 410. Upon receipt, the relying party 106 may decide to terminate the merchant or proceed otherwise when the assessment indicates a problem with the identity may exist. If the identity of the asserting party 104 is determined to be fake or synthetic (either by the identity network 102 or separately by the relying party 106), the relying party 106 may terminate any request pending for the relying party 1206, may terminate any existing relationship with the relying party 106, may terminate any relationship with other parties related to the relying party 106, may report the relying party to one or more authorities, etc.

While the system 100 and method 400 are both described, in general, with reference to merchants, the same may be applied to individuals associated with the merchants (e.g., principle owners, members, executives, employees, etc.) and/or to individuals in general for use in identifying fake or synthetic identities.

In view of the above, the systems and methods herein uniquely provide for proactive monitoring of synthetic party identity fraud. In so doing, different levels of monitoring are utilized to generate an improved metric, in that additional data not previously utilized may now be accounted for. In connection therewith, the systems and methods herein permit identification of synthetic party identities based on various aspects of the synthetic party identities and presentment of the same in a new and unique manner.

In addition, the systems and methods herein provide a new and unique architecture for identifying fake or synthetic (or, in general, fraudulent) identities. For instance, in one aspect, the present disclosure implements and enables a graph theory-based link analysis, by an identity network, for example, of terminated and inquired merchants to identify commonalities of merchants (and identity attributers thereof), both on merchant profiles and principal owner profiles. In doing so, the identity network is configured to flag (or identify) unique identifiers/attributes that have been frequently used across many merchants and principal owners, which could be indications of suspicious synthetic merchants The identified suspicious merchant profile identity attributes may then further be searched against the deep web to verify breached data elements. And, the results are then compiled by the identity network, into an assessment provided to relying parties (such as acquiring and issuing institutions, etc.) to evaluate likelihoods of synthetic merchants.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a computing device, a request from a relying party to assess validity of an identity presented by an asserting party in a network communication between the asserting party and the relying party, the request including identity data associated with the identity of the asserting party; (b) calculating, by the computing device, an assessment metric representative of the validity of the identity of the asserting party, the assessment metric based on at least one score derived from the identity data; (c) transmitting, by the computing device, the assessment metric to the relying party, whereby the relying party utilizes the assessment metric to determine whether or not to further interact with the asserting party in connection with the network communication; (d) calculating, by a first scoring engine associated with the computing device, an early detection score based on a listing of stolen identity attributes; (e) calculating, by a second scoring engine associated with the computing device, a profile score based on a plurality of profiles for fraud and loss; and (f) calculating, by a third scoring engine associated with the computing device, a collusion score based on a listing of parties known to have been involved in fraudulent actions.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a computing device, a request from a relying party to assess an identity of an asserting party in response to a network request by the asserting party to the relying party for one or more products and/or services provided by the relying party, the request including identity data for the identity of the asserting party; (b) determining, by the computing device, one or more attribute commonalities between the identity data of the asserting party and data for multiple identities included in a data structure, the multiple identities in the data structure including one or more fraudulent identities and/or suspicious identities based on termination and/or prior inquiries related to the identities; (c) compiling an assessment based on the determined one or more attribute commonalities, the compiled assessment including at least a number of the determined one or more attribute commonalities; (d) transmitting, by the computing device, the assessment to the relying party, whereby the relying party determines, based on the assessment, whether or not to further interact with the asserting party in connection with the network request; and (e) searching, by the computing device, a deep web for the one or more attribute commonalities.

Further in one embodiment, a non-transitory computer-readable storage medium includes executable instructions for identifying synthetic identities associated with network requests, which when executed by a processor, cause the processor to: receive a request from a relying party to assess an identity of an asserting party in response to a network request by the asserting party to the relying party for one or more products and/or services provided by the relying party, the request including identity attributes of the identity of the asserting party; determine one or more attribute commonalities between the identity attributes of the identity of the asserting party and attributes for multiple identities included in a data structure, each of the multiple identities relating to a fraudulent identity or an identity suspected of being fraudulent based on termination and/or prior inquiries related to the identities; compile an assessment for the identity of the asserting party based on the determined one or more attribute commonalities, wherein the compiled assessment includes at least a number of the determined one or more attribute commonalities; and transmit the assessment to the relying party, whereby the relying party determines, based on the assessment, whether or not to further interact with the asserting party in connection with the network request.

In connection therewith, the executable instructions, when executed by the processor, may cause the processor, in connection with compiling the assessment, to include the number of the determined one or more attribute commonalties in the assessment, whereby the relying party determines whether or not to further interact with the asserting party in connection with the network request based, at least in part, on the number of the one or more links. And, the executable instructions, when executed by the processor, may cause the processor, in connection with compiling the assessment, to further compare the number of the determined one or more attribute commonalities to a threshold and include the comparison in the assessment, whereby the relying party determines whether or not to further interact with the asserting party in connection with the network request further based, at least in part, on the comparison.

And, the executable instructions, when executed by the processor, may also cause the processor to generate a commonality diagram for the multiple identities included in the memory and the executable instructions, when executed by the processor, may cause the processor, in connection with determining the one or more attribute commonalities, to determine the one or more attribute commonalities based on the commonality diagram; while the executable instructions, when executed by the processor, may also cause the processor to search a deep web for the one or more attribute commonalities, and the executable instructions, when executed by the processor, may cause the processor, in connection with compiling the assessment, to include includes an indicator in the assessment in response to at least one of said one or more attribute commonalities being found on the deep web.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in identifying synthetic identities associated with network requests, the method comprising:

receiving, at a computing device, a request from a relying party to assess an identity of an asserting party in connection with an interaction between the asserting party and the relying party, the request including identity data for the identity of the asserting party;

determining, by the computing device, one or more attribute commonalities between the identity data of the asserting party and data for multiple identities included in a data structure, the multiple identities in the data structure including one or more: fraudulent identities or suspicious identities, based on termination and/or prior inquiries related to the identities;

searching a deep web for the determined one or more attribute commonalities;

identifying a number of the determined one or more attribute commonalities;

assigning a first value for each of the determined one or more attribute commonalities associated with the multiple identities being fraudulent or suspicious based on termination;

assigning a second value for each of the determined one or more attribute commonalities associated with the multiple identities being fraudulent or suspicious based on prior inquiries;

aggregating the first value for each of the determined one or more attribute commonalities and the second value for each of the determined one or more attribute commonalities into an aggregated value;

comparing the number of the determined one or more attribute commonalities to a first threshold;

comparing the aggregated value for the determined one or more attribute commonalities to a second threshold;

in response to the number of the determined one or more attribute commonalities exceeding the first threshold or the aggregated value for the determined one or more attribute commonalities exceeding the second threshold, determining the identity of the asserting party to be a synthetic identity;

compiling an assessment based on the determined one or more attribute commonalities, the compiled assessment including i) at least the number of the determined one or more attribute commonalities or the aggregated value for the determined one or more attribute commonalities, ii) an indicator in response to at least one of said one or more attribute commonalities being found on the deep web, and iii) the determination of the synthetic identity for the asserting party; and transmitting, by the computing device, the assessment to the relying party, whereby the relying party determines, based on the assessment, whether or not to further interact with the asserting party.

2. The computer-implemented method of claim 1, wherein the one or more attribute commonalities each include an attribute included in both the identity data of the asserting party and the data for one of the multiple identities in the data structure.

3. The computer-implemented method of claim 1, wherein the identity data of the asserting party includes a government ID number, a mailing address and a phone number.

4. The computer-implemented method of claim 1, wherein each of the one or more attribute commonalities includes an identity attribute associated with the identity data of the asserting party.

5. The computer-implemented method of claim 4, wherein compiling the assessment further includes including at least one of the comparisons in the assessment, whereby the relying party determines whether or not to further interact with the asserting based at least in part on the at least one of the comparisons.

6. The computer-implemented method of claim 1, further comprising generating, by the computing device, a commonality diagram for the multiple identities included in the data structure; and wherein determining the one or more attribute commonalities includes determining the one or more attribute commonalities based on the commonality diagram.

7. A system for use in identifying synthetic identities associated with network requests, the system comprising:

a memory including attributes for multiple identities, each of the multiple identities relating to a fraudulent identity or an identity suspected of being fraudulent based on termination and/or prior inquiries related to the identities; and an identity network computing device in communication with the memory, the identity network computing device configured to:

receive a request from a relying party to assess an identity of an asserting party in response to a network request by the asserting party to the relying party for one or more products and/or services provided by the relying party, the request including identity attributes of the identity of the asserting party;

determine one or more attribute commonalities between the identity attributes of the identity of the asserting party and the attributes for the multiple identities included in the memory, the determined attribute commonalities including links between the identity attributes of the identity of the asserting party and the attributes for the multiple identities included in the memory;

search a deep web for the determined one or more attribute commonalities;

identify a number of said links between the identity attributes of the identity of the asserting party and the attributes for the multiple identities included in the memory;

assign a first value for each of the said links associated with the multiple identities being fraudulent or suspicious based on termination;

assign a second value for each of the said links associated with the multiple identities being fraudulent or suspicious based on prior inquiries;

aggregate the first value for each of the said links associated with the multiple identities being fraudulent or suspicious based on termination and the second value for each of the said links associated with the multiple identities being fraudulent or suspicious based on prior inquiries into an aggregated value;

compare the number of said links between the identity attributes of the identity of the asserting party and the attributes for the multiple identities included in the memory to a first threshold;

compare the aggregated value to a second threshold;

in response to the number of said links exceeding the first threshold or the aggregated value exceeding the second threshold, determine the identity of the asserting party to be a synthetic identity;

compile an assessment for the identity of the asserting party based on the determined one or more attribute commonalities, the compiled assessment including i) at least the number of said links or the aggregated value, ii) an indicator in response to at least one of said one or more attribute commonalities being found on the deep web, and iii) the determination of the synthetic identity for the asserting party; and transmit the assessment to the relying party, whereby the relying party determines, based on the assessment, whether or not to further interact with the asserting party in connection with the network request.

8. The system of claim 7, wherein the identity network computing device is configured, in connection with compiling the assessment, to include at least one of the comparisons in the assessment, whereby the relying party determines whether or not to further interact with the asserting party in connection with the network request based at least in part on the at least one of the comparisons.

9. The system of claim 7, wherein the identity network computing device is further configured to generate a commonality diagram for the multiple identities included in the memory; and wherein the identity network computing device is configured, in connection with determining the one or more attribute commonalities, to determine the one or more attribute commonalities based on the commonality diagram.

10. The system of claim 7, wherein the asserting party is a merchant configured to offer products and/or services for sale to users and wherein the relying party includes an acquiring bank associated with the asserting party; and wherein the system further comprises a payment network configured to process payment account transactions involving the asserting party and users, and wherein the payment network includes the identity network computing device.

* * * * *